July 8, 1958 G. PADGETT 2,841,867
RECIPROCATING DRY SHAVER HEAD CONSTRUCTION
Filed March 15, 1957 2 Sheets-Sheet 1
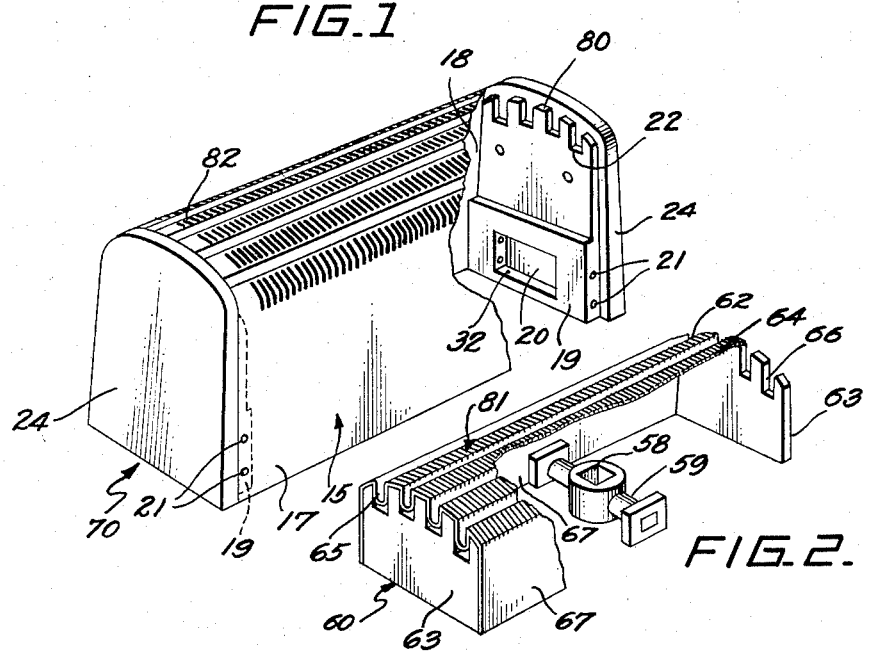
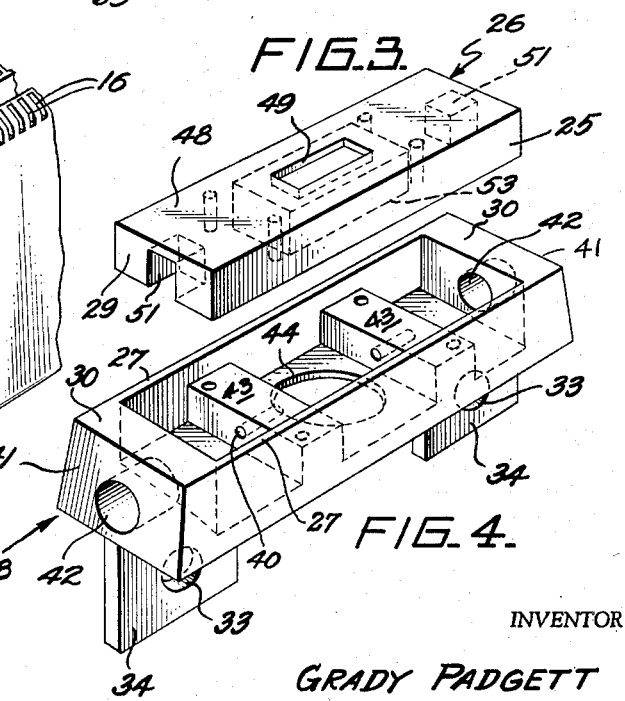
INVENTOR
GRADY PADGETT
BY Richard L. Underwood
ATTORNEY

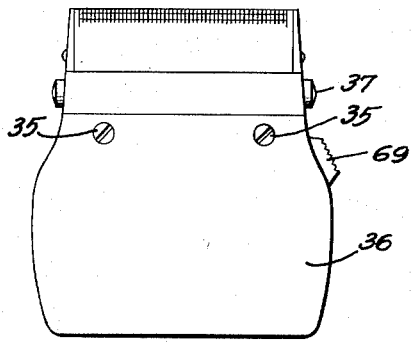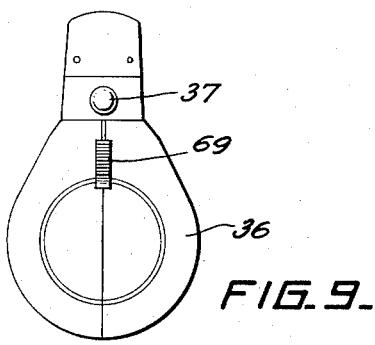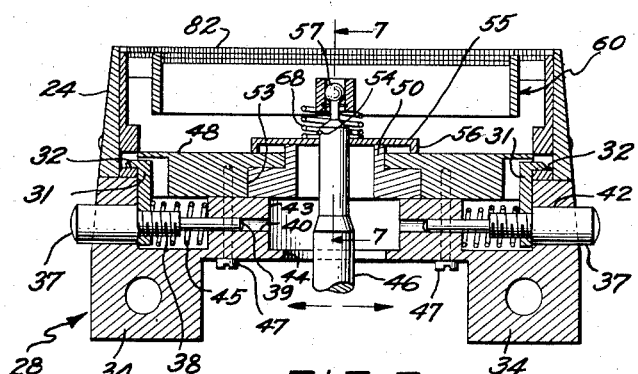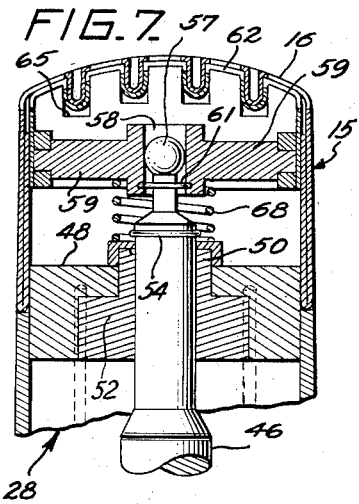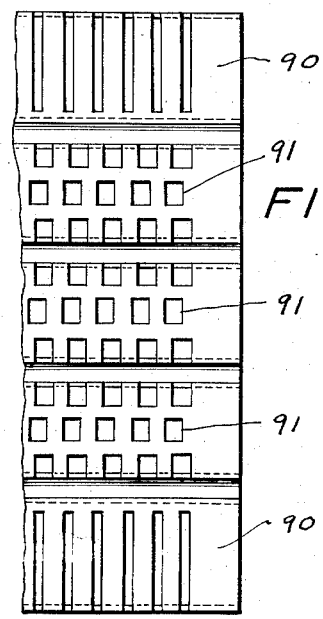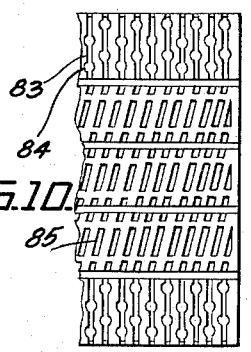

United States Patent Office 2,841,867
Patented July 8, 1958

2,841,867

RECIPROCATING DRY SHAVER HEAD CONSTRUCTION

Grady Padgett, Coral Gables, Fla.

Application March 15, 1957, Serial No. 646,352

5 Claims. (Cl. 30—43)

My invention relates to an improved dry shaver head which provides a plurality of longitudinally extending cutting zones, these zones extending along the length of the shaver head with a minimum of non-cutting structure at the ends.

A dry shaver head, to be satisfactory, must have an outer shearing plate of minimum thickness so that a close shave can be obtained, the closeness of the shave being substantially directly proportional to the thickness of the metal of the shearing plate which contacts the skin. However, in attempting to reduce the thickness of the shearing plate, problems arise due to the weakening of plate, and in some instances the shaver must be used with a feather touch. Pressure would cause flexing of the shearing plate, reduction of efficiency, and possible damage.

My invention provides a strengthened shearing plate, this strength coming from the formation of a plurality of longitudinal U-bends along the length of the shearing plate, each bend acting somewhat as a single self-contained, self-supporting beam structure. The shear plate is mounted on tapered end frames which provide the support for the ends of the beams of the shearing plate. Further, the outer side legs of the shearing plate are uniquely supported on a foundation member so that the shearing plate is in fact inherently strong and is supported in a manner which braces the built-in strength of the plate.

Various slot or perforation designs may be used with this shaver. Various motive powers may also be used, it only being necessary that the cutter reciprocate at a high speed within the shearing plate assembly.

The dry shaver head of my invention comprises an elongated movable cutter which has a longitudinal inverted U-shaped cutter plate with an upper cutter portion formed with a plurality of inverted U-bends or U-segments. Transverse end members support the cutter plate and have mating notches for the ends of the U-bends. A crossbar is provided for attaching the cutter to a driving means. The cutter is slidably received in a shearing plate assembly which has similar U-bends or U-like segments at its upper shear portion, the bight portions of the U-bends being in face-to-face engagement.

The shearing plate assembly seats on a foundation member which in turn is attachable to the shaver body housing an electric power means. The foundation member has a socket which receives a base, the base having a smooth top surface which may be highly polished or chrome plated, this top surface being spaced below the cutter a sufficient distance to enable easy cleaning of the cuttings from the surface when the shearing plate assembly has been removed.

Means are provided for releasably attaching the shearing plate assembly to the foundation member.

The driving means includes a drive rod having a ball at its upper end which fits snugly into a square opening in the crossbar. This arrangement enables the rotation of the cutter to a transverse position to facilitate the removal of cuttings beneath the cutter.

Various other objects and meritorious features of my invention will be apparent from the following description taken in conjunction with the drawings wherein like numerals refer to like parts throughout the several figures and wherein:

Fig. 1 is a perspective view with a portion cut away of the shearing plate assembly;

Fig. 2 is a perspective view with a portion cut away of the cutter;

Fig. 3 is a perspective view of the base;

Fig. 4 is a perspective view of the foundation member, Figs. 1–4 in combination as shown being an exploded view of the parts;

Fig. 5 is a perspective view of a portion of the shearing plate;

Fig. 6 is a vertical sectional view through the shaver head as assembled;

Fig. 7 is a view taken on line 7—7 of Fig. 6, this view being slightly enlarged for clarity;

Fig. 8 is a vertical side view of the shaver assembled;

Fig. 9 is a vertical end view of the shaver assembled;

Fig. 10 is a plan view of a portion of an alternate shearing plate; and

Fig. 11 is a plan view of a portion of another alternate shearing plate.

As will be seen in the drawings (Figs. 1–5), my invention comprises a shearing plate 15 which is formed from very thin gauge metal, the desired perforations 16 being formed in the thin gauge metal prior to the bending of the metal to form a plurality of U-bends 23 such as the five U-bends shown with the outer side legs 17 and 18 forming the side walls of the shearing plate. The shearing plate 15 is attached to end frames 19—19 by suitable means such as the rivets 21 shown, and preferably the legs 17 and 18 are formed of two layers of metal by bending the lower section back on the upper section as shown so that sufficient strength is present for a good connection to the end frames.

The end frames 19—19 are formed with a plurality of slots 22 complementary to and for receiving the four inner legs of the U-bends 23. The end frames 19—19 have latch openings 20—20 at their central lower portions forming catches for latch fingers which attach the shearing plate to the shaver as will be described. Immediately above these latch openings 20—20, the end frames 19—19 are cut away at the inner surface and then tapered outwardly toward the shearing plate to facilitate cutting in close areas by increasing the number of perforations 16 which can be placed in the shearing plate 15. No perforations are provided in the shearing plate 15 at the points of abutment with the support surfaces 80 of the end frames 19—19.

To provide smoothly curved ends for the shearing plate and also to cover the ends of the thin gauge shearing plate and the end frames, cover plates 24—24 are attached by welding or by other suitable means to the outer end surfaces of the end frames 19—19, these cover plates being carefully fitted to blend smoothly with the end edges of the shearing plate 15.

The reversely bent legs 17, 18 of the shearing plate 15 slide over the side walls 25—25 of a base 26 and seat on the upper side edges 27—27 of the foundation member 28; the end plates 19—19 slide down over the end walls 29—29 of base 26 into abutment with the upper end edges 30—30 of foundation member 28. Latches 31—31 (Fig. 6) fit into the opening 20—20 in the end plates 19—19 and engage the catches 32—32 formed thereby to hold the shearing plate assembly 70 of Fig. 1 in position on the shaver.

The foundation member 28 has attaching openings 33—33 in depending central lugs 34—34 for receiving machine screws 35—35 (Fig. 8) to connect the head unit to the shaver body 36 which houses the usual electric power source. Referring now to Figs. 6 and 7, it will be seen that the foundation member 28 houses a latch means at either end of the shaver, each latch means including a push button 37 having a threaded section 38 extending therefrom on which the latch finger 31 is threaded, and a guide pine 39 which rides in guide hole 40 in the foundation member. The guide holes 40—40 are positioned in cross ribs 43—43 on either side of a central opening 44. The push buttons 37—37 are slidably mounted in bearing holes 42—42 in the end walls 41—41 of the foundation member 28. A return spring 45 (Fig. 6) is compressed between each latch finger 31 and each rib 43 for urging the buttons 37—37 and fingers 31—31 outwardly.

The opening 44 is provided in the central part of the foundation member 28 for receiving the drive rod 46 which is driven by the electric power source in body 36. The drive rod 46 is tapered from this point upwardly in steps to reduce its moment of inertia and to accommodate the moving parts. Attached to the foundation member 28 by machine screws 47 is the base 26 which has a top surface 48 highly polished or chrome plated to facilitate removal of cuttings when the shearing plate assembly of Fig. 1 is removed. The top surface 48 has only one opening, this being the rectangular slot 49 in which a drive rod bearing 50 is positioned. The base 26 is mounted within the walls of the foundation member 28, its lower surface being in face-to-face contact with ribs 43—43. Recesses 51—51 are formed at the ends of base 26 for receiving and allowing movement of latches 31—31.

The rectangular nylon or Teflon bearing 50 is mounted within the base 26, it being noted that the bearing 50 has a flange 52 which seats in an enlarged opening 53 in the bottom of the base and is held within the base by the foundation member 28. The bearing 50 provides the rectangular slot which acts as a guide for the reciprocating movement of the reduced diameter drive rod 46. A snap ring 54 seats in a groove in the drive rod 46 for locking a sealing cap 55 over the bearing 50, the sealing cap 55 being a rectangular cap having a sliding fit on the drive rod 46 and extending longitudinally beyond the upper edge of the bearing 50 at either end to provide the required clearance for reciprocating movement thereof with the drive rod. A downwardly extending sealing flange 56 slidably moves close to surface 48 and the sides of bearing 50, the sealing being accomplished at the top of bearing 50, due to the action of spring 68 pressing cap 55 into sealing engagement therewith.

The drive rod 46 has a ball 57 at its upper end which snugly fits into a square opening 58 in the crossbar 59 of cutter 60 (Fig. 2), thereby enabling pivotal movement of cutter 60 to facilitate cleaning of top surface 48. A snap ring 61 is provided in a groove in the crossbar 59 for releasably retaining the cutter 60 on the drive rod 46.

The cutter 60 (Fig. 2) is somewhat similar to the shearing plate assembly 70 (Fig. 1) in overall design but is made of slightly heavier gauge metal and has slots 62 which are slightly larger than the perforations 16 in the shearing plate 15. Also the shearing plate assembly 70 has a longitudinal dimension greater than that of the cutter 60 to allow longitudinal reciprocation of the cutter within the shearing plate assembly. End members 63 are attached by welding or the like to a longitudinal inverted U-shaped cutter plate 64 which has an upper cutter portion 81. A plurality of longitudinal inverted U-bends 65 (such as the five U-bends shown) are provided in the cutter portion 81 and are complementary to the underside of the shearing plate 15. It will be noted that the cutter slots 62 are formed in the upper cutter portion 81 of the cutter plate 64, the slots being at the bight portions of the U-bends 65. The end members 63 are provided with notches 66 for matingly receiving the ends of the U-bends 65 and more specifically the ends of the inner legs of the U-bends 65.

To enable connection of the cutter 60 to the drive rod 46, a transverse crossbar 59 is suitably mounted across the open bottom formed by the cutter 60. Preferably the ends of the crossbar 59 are connected as by welding or the like to the legs 67 of the cutter plate 64.

The U-bends 23 of the shear portion 82 of the shearing plate 15 mate with the U-bends 65 of the cutter portion 81 of the cutter plate 64 with the bight portions of each in face-to-face engagement. Shearing face-to-face engagement of the bight portions is maintained by means of a spring 68 which is compressed between the sealing cap 55 and the cutter 60.

Electrical switch 69 (Figs. 8 and 9) is provided on the housing 36 of the shaver for control of the electric power means.

Various slot or perforation designs may be employed in my razor. The arrangement shown in Fig. 5 provides slots 16 in the outer U-bends 23 which extend downwardly a short distance into the outer side legs 17, these slots providing lands which pick up hairs of extra length.

The design shown in Fig. 10 is another arrangement of lands which is typical of designs which may be satisfactorily used with my invention, this particular design showing slots 83 which are 0.010 inch wide with spaced enlarged openings 84 along their length of about 0.016 inch in diameter, these enlargements to permit easier admission of the hairs to the cutting edges. These slots also extend downwardly along the outer side legs of the shearing plate for engaging long hairs. The three inner bight portions have slots 85 which are on a bias, i. e., they are not at right angles to their longitudinally extending bight portions. These lands or slots 85 will engage bent hairs or hairs growing in whorls.

Fig. 11 shows another alternate design for a suitable shearing plate, wherein the two outer bight portions 90—90 have slots similar to those shown in Fig. 5 and the three inner bight portions have enlarged rectangular openings 91.

The valleys in the bends of the shearing plate 15 may be filled or partly filled with plastic or metal to form internal ribs, as shown at 95 in Fig. 5, to rigidify the shearing plate and to make smoother the face skin contacting surface. The smooth upper surface for the shearing plate may also be obtained by manufacturing techniques which will produce the required ribs, such as machining, forging, or the like.

The construction of the cutter 60 shown in Fig. 2 is preferred as it provides a cutter with the required strength and yet of exceptionally light weight. Various means may be employed to connect the foundation member 28 to a shaver body; in certain types, lugs extending from the sides will be employed.

Various other modified forms of the invention will be apparent from the foregoing description and for that reason I wish to limit myself only within the scope of the appended claims.

I claim:

1. In a dry shaver head, an elongated movable cutter including a longitudinal inverted U-shaped cutter means having inner side legs and an upper cutter portion, said upper cutter portion having a plurality of longitudinal, inverted U-segments having cutter slots at the bight portions thereof, said cutter including transverse end members connected to the lower and inner surfaces of said cutter means at the ends thereof and having notches for matingly receiving said U-segments, and a crossbar across the open bottom of said cutter means for connection to a driving means, said open bottom enabling cuttings to fall freely from within the confines of said cutter, and a fixed shearing assembly including a longitudinal inverted U-shaped shearing means having outer side legs and an upper shear portion, said shear portion having a plurality of longitudinal inverted adjacent U-like segments having shear perforations at the bight portions thereof, the U-like segments in said shear portion mating with the U-segments in said cutter portion with the bight portions of each in face-to-face engagement, said shearing assembly including transverse end frames connected to the lower and inner surfaces of said shearing means at the ends thereof and having slots for matingly receiving the U-like segments thereof, said shearing assembly having a longitudinal dimension greater than that of said cutter to allow longitudinal reciprocation therein of said cutter.

2. In a dry shaver head as defined in claim 1 and wherein said transverse end frames of said shearing assembly have catches for facilitating connection to a shaver body at their lower portions and have tapered upper portions to minimize the non-cutting area of the shearing means.

3. In a dry shaver head as defined in claim 1 and including means for connecting said shearing assembly and said cutter to a shaver body comprising a foundation member having connecting means for connection to a shaver body, a bottom, side walls and end walls which define a socket, a base positioned within said socket and having a top surface for receipt of cuttings spaced below said cutter, said foundation member and said base being rigidly connected together and having a central shaft opening adapted for passage of a drive shaft to said cutter, a bearing in said opening, a sealing cap positioned on said top surface and having a hole adapted for receipt of the drive shaft, said sealing cap extending beyond said central shaft opening sufficiently to maintain a seal at the opening during reciprocation with the drive rod, a spring compressed between the sealing cap and the cutter for biasing the cutter against the shearing means.

4. In a dry shaver head as defined in claim 1 and wherein said outer side legs and said transverse end frames of said shearing assembly seat on the top edges of said side and end walls of said foundation member, said foundation member having transverse ribs in said socket on either side of said central shaft opening, said end walls having longitudinal bearing holes and said ribs having longitudinal guide holes aligned with said bearing holes, latch means slidably mounted in each pair of adjacent bearing holes and guide holes, each latch means including spring means seated against its respective rib for biasing said latch means outwardly into latching engagement with said catches in said shearing assembly.

5. In a dry shaver head, an elongated movable cutter including a longitudinal inverted U-shaped cutter plate having inner side legs and an upper cutter portion, said upper cutter portion having a plurality of longitudinal, inverted U-bends having cutter slots at the bight portions thereof, said cutter including transverse end members connected to the lower and inner surfaces of said cutter plate at the ends thereof and having notches for matingly receiving said U-bends, and a crossbar across the open bottom formed by said cutter plate having a square opening, a drive means including a drive shaft having a ball at its upper end positioned in said square opening to enable pivotal movement of said cutter to facilitate cleaning, said open bottom enabling cuttings to fall freely from within the confines to said cutter, and a fixed shearing plate assembly including a longitudinal inverted U-shaped shearing plate having outer side legs and an upper shear portion, said shear portion having a plurality of longitudinal inverted U-bends having shear perforations at the bight portions thereof, the U-bends in said shear portion mating with the U-bends in said cutter portion with the bight portions of each in face-to-face engagement, said shearing plate assembly including transverse end frames connected to the lower and inner surfaces of said shearing plate at the ends thereof and having slots for matingly receiving the U-bends thereof, said shearing plate assembly having a longitudinal dimension greater than that of said cutter to allow longitudinal reciprocation therein of said cutter.

References Cited in the file of this patent
UNITED STATES PATENTS

| 2,184,757 | Samotey | Dec. 26, 1939 |
| 2,190,481 | Nyhagen | Feb. 13, 1940 |
| 2,289,875 | Dalkowitz | July 14, 1942 |

FOREIGN PATENTS

| 1,125,027 | France | July 9, 1956 |